United States Patent
Muramatsu et al.

(10) Patent No.: US 7,110,613 B2
(45) Date of Patent: Sep. 19, 2006

(54) IMAGE PROCESSING APPARATUS AND IMAGE PICKUP DEVICE

(75) Inventors: Shoji Muramatsu, Hitachi (JP); Yuji Otsuka, Hitachi (JP); Yoshiki Kobayashi, Hitachi (JP); Hiroshi Takenaga, Tokai (JP); Jiro Takezaki, Hitachinaka (JP); Tatsuhiko Monji, Hitachinaka (JP); Isao Furusawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 861 days.

(21) Appl. No.: 10/101,052

(22) Filed: Mar. 20, 2002

(65) Prior Publication Data

US 2003/0063773 A1    Apr. 3, 2003

(30) Foreign Application Priority Data

Oct. 2, 2001    (JP)    ............................. 2001-306528

(51) Int. Cl.
G06K 9/36    (2006.01)

(52) U.S. Cl. .................. 382/280; 382/276; 382/199; 340/933

(58) Field of Classification Search ................ 382/104, 382/106, 141, 144–147, 151, 242, 266, 190, 382/199, 276, 305; 340/907, 933; 348/113
See application file for complete search history.

(56) References Cited

U.S. PATENT DOCUMENTS

| | | | |
|---|---|---|---|
| 4,870,500 A * | 9/1989 | Nagashima ................. 358/443 |
| 5,010,581 A * | 4/1991 | Kanno ........................ 382/305 |
| 5,065,447 A | 11/1991 | Barnsley |
| 5,465,163 A * | 11/1995 | Yoshihara et al. .......... 358/444 |
| 6,124,884 A * | 9/2000 | Fujii et al. .................... 348/93 |
| 6,192,080 B1 * | 2/2001 | Sun et al. .............. 375/240.16 |
| 6,252,577 B1 * | 6/2001 | Rashkovskiy et al. ...... 345/670 |
| 6,697,106 B1 * | 2/2004 | Saito ........................ 348/222.1 |
| 2002/0067923 A1 * | 6/2002 | Fujimura ..................... 396/429 |
| 2004/0052420 A1 * | 3/2004 | Nakaya ...................... 382/238 |
| 2004/0184534 A1 * | 9/2004 | Wang .................... 375/240.03 |

FOREIGN PATENT DOCUMENTS

| | | |
|---|---|---|
| CN | 1213255 | 4/1999 |
| EP | 245504 A1 | 11/1987 |
| EP | 0841558 A2 * | 5/1998 |
| JP | 06004651 | 1/1994 |
| JP | A-6-4651 | 1/1994 |
| JP | 2001101396 | 4/2001 |
| JP | A-2001-101396 | 4/2001 |

* cited by examiner

Primary Examiner—Jingge Wu
Assistant Examiner—Ali Bayat
(74) Attorney, Agent, or Firm—Mattingly, Stanger, Malur & Brundidge, P.C.

(57) ABSTRACT

Information of light from a subject is converted into information of the electric charges to generate image data for one screen in an image pickup device, the image data is outputted to an image processing LSI, only the image data belonging to a plurality of areas is selected by a processing amount reduction unit, the selected image data is transferred to a RAM in a single chop by a data transfer unit, and the processing of recognizing a white line is executed by a CPU on the basis of the image data stored in the RAM.

8 Claims, 9 Drawing Sheets

IMAGE PROCESSING APPARATUS AND IMAGE PICKUP DEVICE

BACKGROUND OF THE INVENTION

The present invention relates to an image processing apparatus and more particularly to an image processing apparatus which is suitable for executing the arithmetic operation processing for image data stored in a work memory.

The image processing technology for processing image data obtained by an image pickup device has begun to be adapted to the monitoring system for detecting the invasion of a doubtful person or the abnormality and to the onboard system for supporting the safety travelling of a motorcar. In order to adapt the image processing technology to these systems, the small space and the low cost of an image processing apparatus are required. In order to realize the small space and the low cost, there is required the device of executing the image processing at high speed with the limited arithmetic operation ability of a CPU (Central Processing Unit) and the limited hardware physical superiority. As for the method of miniaturizing the image processing apparatus, for example, there is the method of adopting the single chip. The single chip is such that a CPU for executing the arithmetically operation processing, a ROM (Read Only Memory) for storing therein a program, a RAM (Random Access Memory) used as a work memory, and the functions required to construct the systems such as a network and a serial port are collectively integrated with each other into a package of one chip. By using this single chip, it becomes possible to realize the system, which is heretofore constructed by employing a plurality of devices, in one chip, which can contribute to the small space and the low cost of the image processing apparatus.

On the other hand, in order to execute the high speed image processing using a single chip, it is necessary to execute the image processing using a suitable memory within the single chip. This reason is that an access from a CPU to the external memory provided outside the single chip is generally slower than that to a local memory (work memory) provided in the inside of the single chip. For this reason, when executing the image processing using the external memory, it becomes difficult to provide the practical throughput. For example, with respect to the white line (traffic line or lane) recognizing function adopted in the on-board system, the recognition at the video rate is required and hence the high speed processing is required. But, in the case where the processing is executed using the external memory, it is difficult to fulfill the required performance. In addition, in the case of an environment resistance type single chip for use in the control or the like of motorcars, since the capacity of a memory in the single chip is small, an amount of data which can be processed at high speed is limited.

Then, as described in JP-A-2001-101396, there is proposed a method wherein image data stored in the external memory is sent to a local memory, which is integrated with a processor into one chip, through the DMA (Direct Memory Access) transfer to process the image data at high speed. In addition, as described in JP-A-6-4651, there is also proposed a method wherein only the data in an area which is used in the processing is transferred in order to execute the image processing at high speed. Each of those prior arts adopts the construction in which the image data is stored in the external memory and the necessary image data, when necessary, is transferred to the local memory in order to be processed.

SUMMARY OF THE INVENTION

In the former of the above-mentioned prior arts, only the image data, which is required for the image processing, of the image data stored in the external memory is transferred to the local memory to realize the high speed processing.

More specifically, the image data which has been generated by an image pickup device is inputted to an LSI for image processing through a wiring, the image data processed in the image processing LSI is transferred to the external memory through a bus by a data transfer unit, and the image data stored in the external memory is transferred to the local memory in the single chip. In this case, the image data for one screen is transferred to the external memory, and only the necessary image data of the image data stored in the external memory is transferred to the local memory in the single chip to execute the image processing at high speed. Thus, there is adopted the method wherein when transferring the image data to the external memory, the image data for one screen is transferred in its entirety. However, if the recognition of a white line (traffic line or lane) on a road is taken into consideration in the image processing apparatus for on-board, since the white lines do not appear in the full screen, it is also conceivable to transfer the image data in the area having the white lines appearing therein to the external memory. But, in the prior art, the construction in which the image data for the whole one screen is stored in the external memory is adopted by taking into consideration the possibility that the area of the white line to be searched may be changed due to the image processing algorithm or the change in the vehicle position.

However, while in the case of such construction, no problem occurs when the external memory has a sufficient capacity, in the apparatus for which the low cost is regarded as important, the case where the capacity of the external memory is either insufficient or not present must also be considered. At this time, since when the local memory in the single chip has the insufficient capacity, there is no storage unit for storing therein image data, it is impossible to construct the image processing system. In actual, since the capacity of the local memory is small in the case of the currently usable single chip, the application is limited which can be made fit for practical use in the image processing apparatus which is loaded with only a local memory as storage means.

On the other hand, while in the latter of the above-mentioned prior arts, only the data used in the image processing is transferred to execute the processing at high speed, when there is no memory capacity enough to store the data of the original image, it becomes impossible to store the image data in a memory, and hence it is impossible to construct the image processing system.

In the light of the foregoing, the present invention has been made in order to solve the above-mentioned problems associated with the prior art, and it is therefore an object of the present invention to provide an image processing apparatus which is capable of miniaturizing an image data storage unit as a local memory without employing any of the external memories, and an image pickup device for use in the same.

In order to attain the above-mentioned object, according to one aspect of the present invention, there is provided an image processing apparatus including: an image data storage unit for storing therein image data transferred thereto; an arithmetic operation processing unit for operating arithmetically and processing the image data stored in the image data storage unit; and a data transfer unit for receiving, as its input, the image data and for transferring a plurality of image data, an amount of which is less than that of inputted image data, of the input image data to the image data storage unit.

When constructing the above-mentioned image processing apparatus, there may also adopted the construction in which an image pickup device for converting information of light from a subject into information of the electric charges to generate successively image data for one screen is provided, and also the image data generated by the image pickup device is inputted to the data transfer unit. In this case, it is preferable that the physical storage capacity of the above-mentioned image data storage unit is set less than an amount of image data outputted from the above-mentioned image pickup device.

In addition, according to another aspect of the present invention, there is provided an image processing apparatus including: an image data storage unit for storing therein image data; an arithmetic operation processing unit for operating arithmetically and processing the image data stored in the image data storage unit; an image data generation unit for converting information of light from a subject into information of the electric charges to generate successively image data for one screen; and a data transfer unit for transferring a plurality of image data, an amount of which is less than that of generated image data, of the image data generated by the image data generation unit to the image data storage unit.

When constructing each of the above-mentioned image processing apparatuses, it is possible to add the following elements.

(1) The data transfer unit transfers, as the plurality of image data, the image data in a plurality of areas on a screen as the object of the arithmetic operation processing in the arithmetic operation processing unit.

(2) The data transfer unit transfers the image data in a plurality of areas on a screen as the object of the arithmetic operation processing in the arithmetic operation processing unit separately in plural times every image data in a single area.

(3) The data transfer unit transfers, as the plurality of image data, the different kinds of image data separately for kinds.

(4) The data transfer unit transfers the image data of a plurality of edge parts in which the change in concentration within the image is equal to or higher than a fixed level and also transfers coordinate information of the plurality of edge parts.

(5) The data transfer unit transfers the image data, of a plurality of edge parts in which the change in concentration within the image is equal to or higher than a fixed level, of the image data within a plurality of areas on a screen as the object of the arithmetic operation processing in the arithmetic operation processing unit, and also transfers coordinate information of the plurality of edge parts.

In addition, according to still another aspect of the present invention, there is provided an image pickup device including: an image data generation unit for converting information of light from a subject into information of the electric charges to generate successively image data for one screen; and an area selection unit for selecting the image data, belonging to a plurality of areas, of the image data for one screen generated by the image data generation unit.

When constructing the above-mentioned image pickup device, it is possible to add the following elements.

(1) The image pickup device further includes a data output unit for outputting the image data belonging to the plurality of areas selected by the area selection unit together with area information used to specify the plurality of areas.

(2) The image pickup device further includes a data transfer unit for transferring the image data outputted by the data output unit to an image data storage unit for storing therein the image data by either a DMA transfer method or a transfer method based on an SRAM access.

(3) The image pickup device further includes: an exposure time detection unit for detecting that the exposure time required to generate the image data fir one screen has been completed; and a data transfer unit for transferring the image data outputted by the data output unit to the image data storage unit for storing therein image data on condition that the completion of the exposure time has been detected by the exposure time detection unit.

(4) The image pickup device further includes a transfer request output unit for when the completion of the exposure time has been detected by the exposure time detection unit, outputting a transfer request for transferring the image data to the destination of transfer.

(5) The image pickup device further includes an image data storage unit for storing therein the image data generated by the image data generation unit in correspondence to pixels for one screen, wherein addresses of the image data stored in the image data storage unit are mapped in such a way as to be associated with a memory space part in the arithmetic operation processing unit for operating arithmetically and processing the image data.

(6) An image pickup device includes: an image data generation unit for converting information of light from a subject into information of the electric charges to generate successively image data for one screen; and an area selection unit for selecting successively the image data, belonging to a plurality of areas, of the image data for one screen generated by the image data generation unit every single area.

(7) An image pickup device includes: an image data generation unit for converting information of light from a subject into information of the electric charges to generate successively image data for one screen; an area selection unit for selecting successively the image data, belonging to a plurality of areas, of the image data for one screen generated by the image data generation unit every single area; and a data transfer unit for holding the image data selected by the area selection unit and for transferring successively the image data thus held every single area.

According to the above-mentioned means, a plurality of image data, an amount of which is less than that of input image data, of the image data used in the arithmetic operation processing is selected before the image data is stored in the image data storage unit, and only the image data thus selected is stored in the image data storage unit. Therefore, it is possible to reduce the storage capacity of the image data storage unit as a local memory (work memory) without employing any of the external memories, which can contribute to the small space and the low cost. In addition, since an amount of image data stored in the image data storage unit is reduced, the load applied to a bus through which the image data is transferred is reduced, and the high speed processing by the arithmetic operation unit (CPU) becomes possible all the more. Furthermore, the processing of writing the image data to the image data storage unit can be suppressed to a minimum.

In addition, when transferring the image data, the image data in a plurality of areas on the screen or the image data of a plurality of edge parts in which the concentration change in the image is equal to or higher than a predetermined level is transferred, whereby it is possible to reduce an amount of data. Moreover, the image data of a plurality of edge parts, in which the concentration change in the image is equal to or higher than a fixed level, of the image data in a plurality of areas on the screen is transferred together with the coordinate information, whereby it is possible to reduce an amount of data.

In addition, according to the image pickup device of the present invention, since the image data, belonging to a plurality of areas, of the image data for one screen is selected to be outputted, it is possible to increase the transfer speed when transferring the image data generated by the image pickup device. Further, the function of selecting/transferring the image data is added to the image pickup device to provide one chip module, which can contribute to the small space and the low cost.

Other objects, features and advantages of the invention will become apparent from the following description of the embodiments of the invention taken in conjunction with the accompanying drawings.

DETAILED DESCRIPTION OF THE EMBODIMENTS

An embodiment of the present invention will hereinafter be described in detail with reference to the accompanying drawings.

Figure 1:
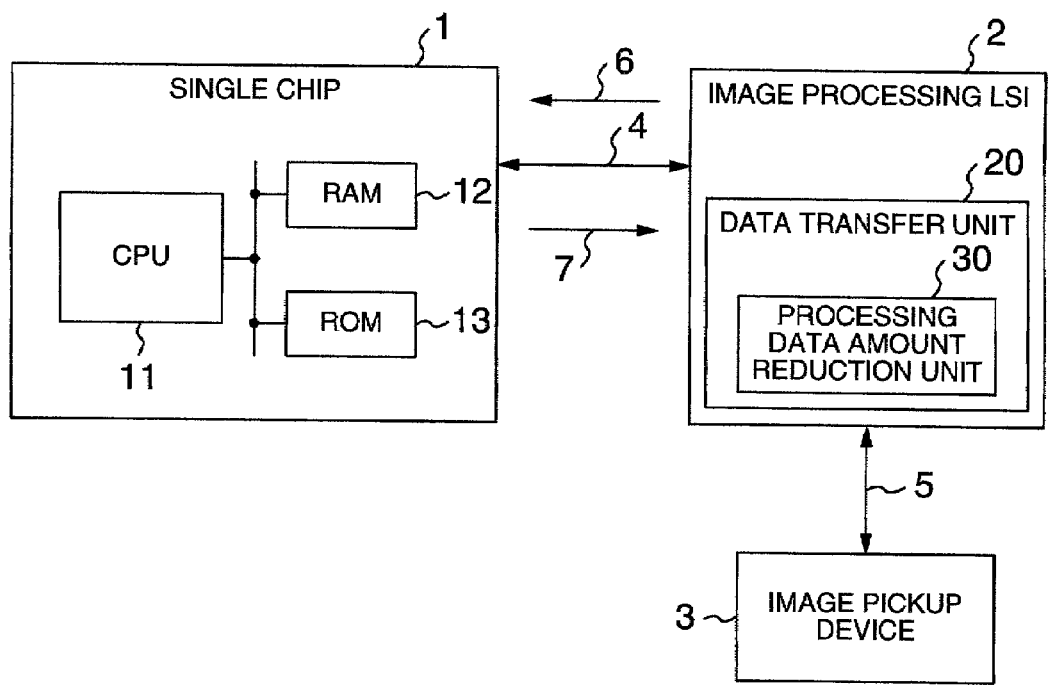
FIG. 1 is a block diagram showing a configuration of an image processing apparatus according to a first embodiment of the present invention.

FIG. 1 is a block diagram showing a configuration of an image processing apparatus for recognizing white lines (traffic lines or lanes) on a road to identify the position of a driver's vehicle according to one embodiment of the present invention. For the image processing apparatus as the on-board system, the small space and the low cost are the mandatory requirement for the practical use, and also by taking into consideration the adoption of the present invention to motorcars for which the high safety is required, an environment resistance type single chip is adopted in the present embodiment. In addition, the image processing apparatus is provided in which the single chip is adopted and the limited local memory in the single chip is used, whereby the high speed image processing is realized with the less hardware physical superiority. Hereinbelow, the concrete contents will be described with reference to FIG. 1.

In FIG. 1, the image processing apparatus includes a single chip 1, an image processing LSI 2, and an image pickup device 3. Then, the single chip 1 is connected to the image processing LSI 2 through a bus 4, and the image processing LSI 2 is connected to the image pickup device 3.

The image pickup device 3 has the function as an image data generation unit for converting information of light from this world, i.e., light from a subject into information of the electric changes to generate successively digital image data at intervals of 1/60 seconds for example, and is generally constituted by a sensor including a CCD (Charge Coupled Device) and a CMOS (Complementary Metal-Oxide Semiconductor). The image data which has been generated by the image pickup device 3 is inputted as an image pickup device data output (indicated by an arrow 5) to the image processing LSI 2. The image processing LSI 2 subjects the image data inputted thereto to the image processing, and then a specified plurality of image data of the image data which has been obtained after the image processing is selected by a unit 30 for reducing an amount of processing data. The image data to be transferred is selected by the unit 30 for reducing an amount of processing data, whereby the processing of reducing an amount of transferring data is executed.

Figure 2:
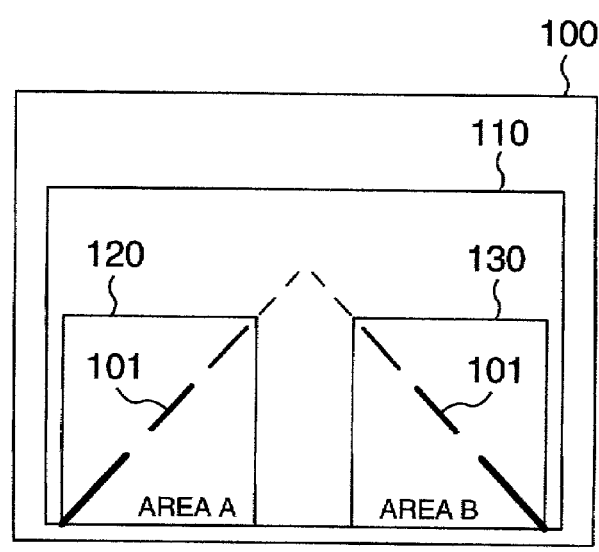
FIG. 2 is a conceptual diagram useful in explaining image data used in white line recognition.

The image data which has been selected by the unit 30 for reducing an amount of processing data is transferred to the single chip 1 through a bus 4 by a data transfer unit 20 (indicated by an arrow 6). In this case, as shown in FIG. 2, the image pickup device 3 generates successively the image data for one screen with respect to a screen 100, and at the time when the image data has been inputted to the image processing LSI 2, the image data belonging to an area A 120 and an area B 130 each of which is smaller than the screen area 100 is transferred-to the single chip 1 through the bus 4. The setting of the area A 120 and the area B 130 (indicated by an arrow 7) is determined by a program stored in a ROM 13 in the single chip 1. That is, the control signal obedient to this determination is inputted from the single chip 1 to the image processing LSI 2 through the bus 4 to set the area A 120 and the area B 130.

The single chip 1 includes a CPU 11 acting as an arithmetic operation processing unit for operating arithmetically and processing the image data, a RAM 12 which is a work memory or a local memory and which acts as an image data storage unit for storing therein the image data transferred thereto, and a ROM 13 for storing therein a program and the like. Then, the CPU 11 is adapted to process the image data stored in the RAM 11 to recognize white lines on a road. The program for recognizing white lines is stored in the ROM 13. Any of the programs stored in the ROM 13, similarly to the image data stored in the RAM 12, can be accessed at high speed by the CPU 11.

Figure 3:
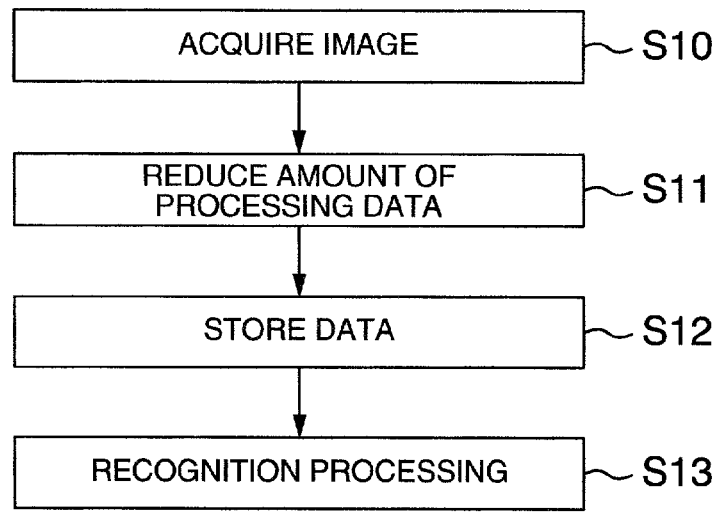
FIG. 3 is a flow chart useful in explaining the operation of the image processing apparatus shown in FIG. 1.

In the image processing apparatus configured as described above, as shown in FIG. 3, first of all, the image pickup device 3 acquires an image on the basis of light from a subject in order to generate the image data (Step S10), and transfers successively the generated image data for one screen to the image processing LSI 2. Then, the image processing LSI 2, prior to the storage of the image data, executes the processing of reducing an amount of processing data (Step S11). By the processing of reducing an amount of processing data is meant the processing of limiting the image data intended to be recorded in the RAM 12 within the single chip 1 to the data which is required to be processed, and in the present embodiment, is meant the processing of selecting only the image data belonging to the area A 120 and the area B 130 shown in FIG. 2 to transfer the image data thus selected. The image data of white lines (that is, traffic lines or lanes) 101 is contained in the area A 120 and the area B 130, respectively, and after completion of the transfer thereof to the single chip 1, is stored in the RAM 12 in the single chip 1 (Step S12). Thereafter, the CPU 11 starts to arithmetically operate and process the image data stored in the RAM 12 to execute the processing of recognizing the white lines 101 (Step S13).

As described above, in the present embodiment, before storage of the image data in the RAM 12, the image data an amount of which is less than that of image data inputted from the image pickup device 3 is selected to reduce an amount of image data. As a result, it becomes unnecessary to provide the external memory for storing therein all of the image data as in the prior art, and hence the system can be constructed by the less hardware physical superiority, and also it is possible to reduce the hardware physical superiority and the load applied to the bus 4.

By the way, while in the present embodiment, the processing of reducing an amount of processing data and the processing of storing the data are seperately executed, in actual, the processing is executed in which it is selected whether the input data is the data required to be processed one image data by one image data or is the data not required to be processed in such a manner, and after completion of the selection, only the selected data is written to the RAM 12. Therefore, the processing of interest is the pipeline processing.

Figure 4:
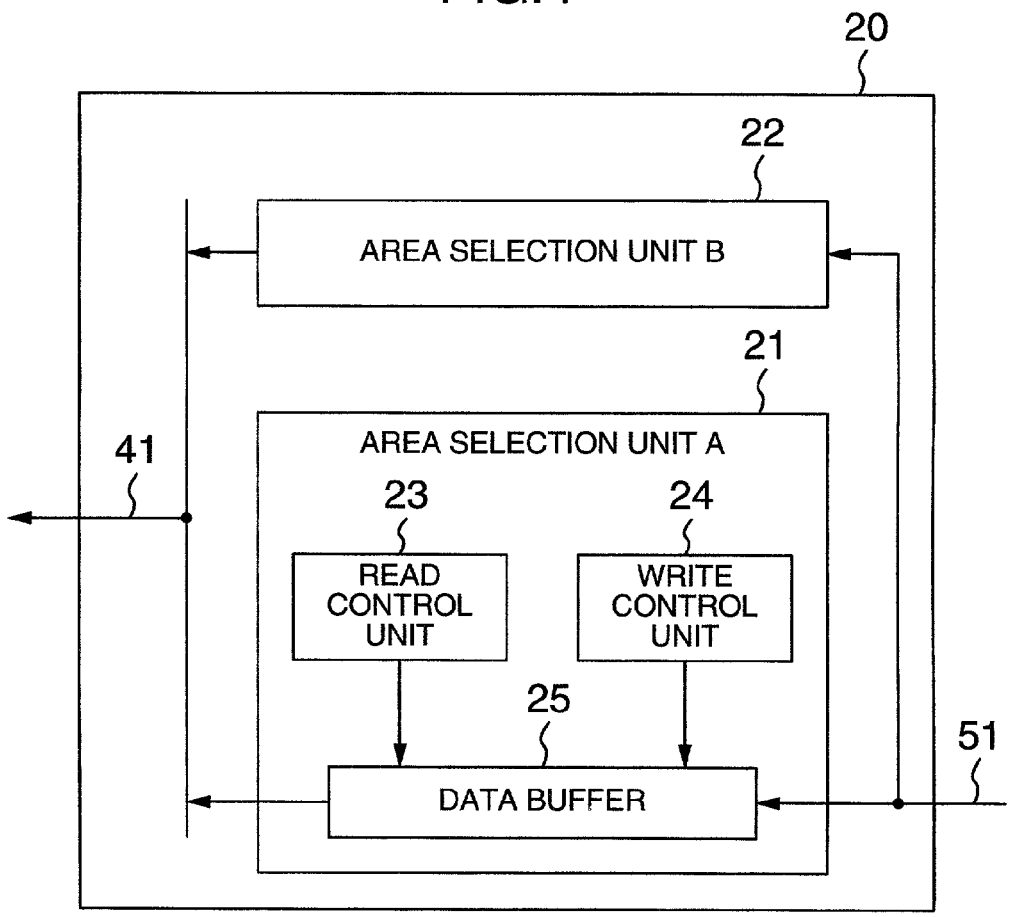
FIG. 4 is a block diagram showing a configuration of a data transfer unit.

Next, the description will hereinbelow be given with respect to a concrete configuration of the data transfer unit 20 with reference to FIG. 4. In FIG. 4, the data transfer unit 20 has the function of transferring the image data belonging to the area A 120 and the area B 130 shown in FIG. 2 to the RAM 12 in the single chip 1, and also includes an area selection unit A 21 for selecting the image data belonging to the area A 120, and an area selection unit B 22 for selecting the image data belonging to the area B 130. The image data outputted from the image pickup device 3 are inputted to each of the area selection unit A 21 and the area selection unit B 22 through a wiring 51. Then, since the area selection unit A 21 and the area selection unit B 22 have the same function, in this case, the description will now be given with respect to only the area selection unit A 21. The image data which has been inputted through the wiring 51 is written to a data buffer 25 in accordance with a write signal controlled by a write control unit 24. Now, the write control unit 24 holds a circuit for identifying the coordinate position of the image data inputted through the wiring 51 and also has the function of discriminating whether or not the inputted image data is the image data within the area A 120. Then, if it is discriminated that the inputted image data is the image data within the area A 120, then the write control unit 24 permits the write of the image data of interest to the data buffer 25 so that the write processing is executed. As a result, only the image data within the area A 120 is recorded in the data buffer 25. At the time when an equal to or larger than a certain constant amount of image data is stored in the data buffer 25, a request of transferring the image data to the RAM 12 within the single chip 1 is made by the data buffer 25 to start the transfer of the image data to the RAM 12. At this time, a read control unit 23 carries out the read control required for the DMA transfer from the single chip 1 to control the processing of reading out the image data stored in the data buffer 25. Then, the image data thus read out is transferred to the RAM 12 through the DMA transfer.

Figure 5:
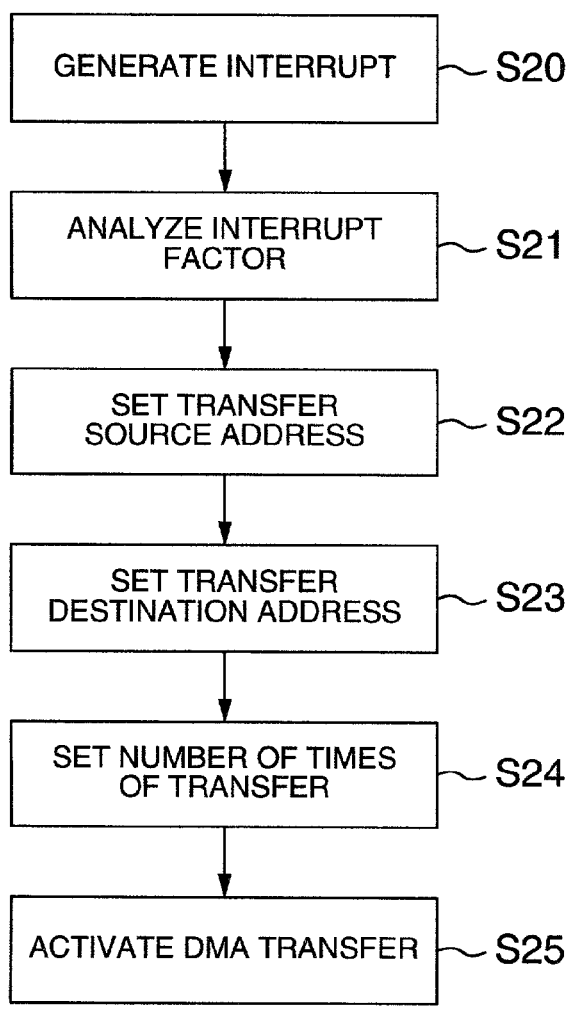
FIG. 5 is a flow chart useful in explaining the processing of DMA transfer.

After the transfer request has been outputted from the data buffer 25 to the single chip 1, that transfer request is processed as the interrupt for the CPU 11 in the single chip. The processing flow at this time will now be described with reference to FIG. 5.

Figure 6:
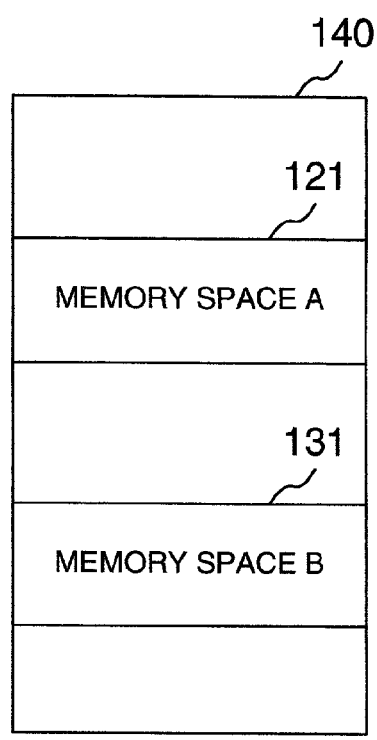
FIG. 6 is a diagram showing a structure of a memory space part becoming a destination of transfer in the DMA transfer.

First of all, after the transfer request has been outputted from the data buffer 25 to the CPU 11 in the single chip 1, in response to that transfer request, the CPU 11 generates an interrupt (Step S20). Then, the CPU 11 in the single chip 1 analyzes the interrupt factor or condition (Step S21). That is, the CPU 11 analyzes whether or not the transfer request is inputted from the data buffer 25 due to the fact that the number of image data stored in the data buffer 25 has become equal to or larger than the constant amount. When it is analyzed that the transfer request is inputted from the data buffer 25 due to the fact that the number of image data stored in the data buffer 25 has become equal to or larger than the constant amount, an output address of the data buffer 25 is set as an address of transfer source (Step S22). Next, an address of transfer destination of the data is set (Step S23). In this case, as shown in FIG. 6, a memory space A 121 in a memory space part 140 of the RAM 12 is assumed as an area in which the data in the area A 120 is stored, and the head address of the memory space A 121 is set as the address of transfer destination. After completion of the setting of the address of transfer source and the setting of the address of transfer destination, the transfer number of times of DMA transfer is determined from the total number of the data stored in the data buffer 25 to set the number of times of transfer (Step S24). Finally, the DMA transfer is activated (Step S25) to DMA-transfer the image data in the data buffer 25 to the memory space A 121 in the RAM 12 in the single chip 1. Those processings are repeatedly executed until the image processing of the image data for one screen has been completed.

By the way, in the case as well where the data buffer of the area selection unit B 22 makes the transfer request, the DMA transfer is carried out on the basis of the same processing flow. This processing is repeatedly executed until the completion of the processing of the image data for one screen.

According to the present embodiment, since only the image data required for the processing is transferred to the RAM (local memory) 12 within the single chip 1, it is possible to reduce the storage capacity for the data. In addition, since an amount of transferring data is also small, it is possible to reduce the load applied to the bus, and also it is possible to prevent the reduction of the throughput of the CPU 11. In addition, since the image processing apparatus includes a plurality of data transfer units, the data in a plurality of areas can be transferred to the memory space part for the purpose of being readily arithmetically operated. This result in that it is unnecessary to execute the processing of rearranging the data, and the like in the processing of recognizing while lines after completion of the data transfer, and can also contribute to the reduction of an amount of arithmetic operations.

Figure 7A:
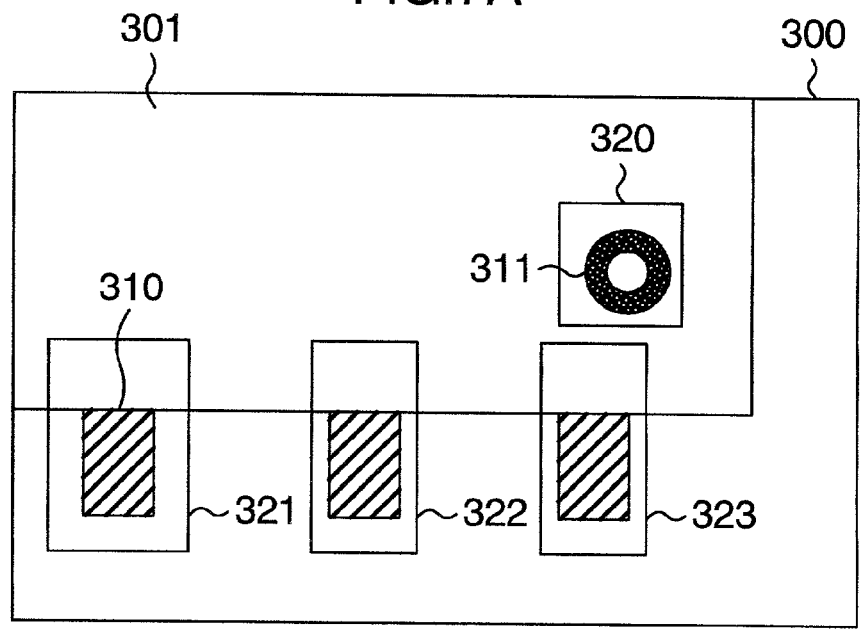
FIG. 7A is a diagram showing an example of displaying an image of a chip according to another embodiment of the present invention.
Figure 7B:
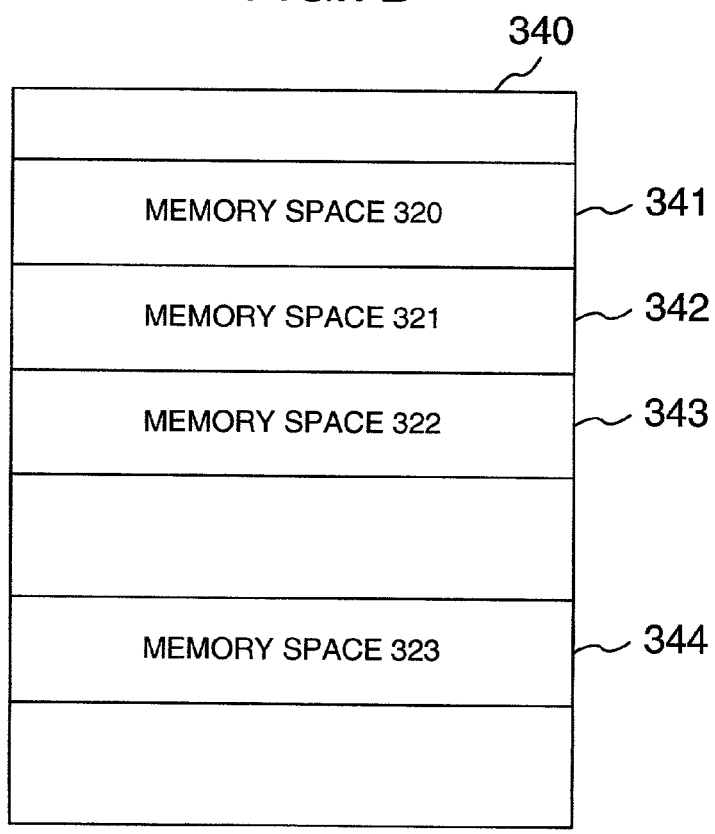
FIG. 7B is a diagram showing a structure of a memory space part according to another embodiment of the present invention.

While in the present embodiment, the description has been given with respect to the image data, belonging to the two areas, as the image data to be transferred to the RAM 12 within the single chip 1, it is also possible to adopt the configuration of transferring the image data belonging to equal to or larger than three areas. Now, the description will hereinbelow given with respect to an embodiment when transferring the image data belonging equal to or larger than three areas with reference to FIGS. 7A and 7B. In the embodiment shown in FIGS. 7A and 7B, the inspection of leads 310 of a semiconductor part is supposed, and the inspection of the leads 310 is the application for which though a wide field of view is employed, the high measurement accuracy is required. An image processing apparatus for inspecting the leads 310, in order to enhance the measurement accuracy, is adapted to acquire an image 300 in the form of a high definition image. This image 300 contains a marker 311 which is formed on a chip 301 in order to align the chip 301, and the leads 310, as the objects of the inspection, which are extracted from an end part of the chip 301. In the case of this inspection, the image data of the whole screen is not used, but only the image data belonging to areas 320, 321, 322 and 323 having the possibility of the presence of the marker 311 and the leads 310 is used. Those areas are not fixed because they are dispersed depending on time, lots and parts, and hence need to be set by a program.

In the present embodiment, memory spaces 341 342, 343 and 344 corresponding to the areas 320, 321, 322 and 323 used in the image processing are ensured on a memory space part 340 in the RAM 12. Then, the image data belonging to the respective areas is transferred as the image data required for the image processing to the RAM 12 on the single chip 1 by data transfer units corresponding to the areas. In this case, the CPU 11 recognizes the length of each of the leads 310 to check the quality of the leads 310.

According to the present embodiment, since though the high definition image data is used, only the image data required for the processing is transferred, it is possible to record the image data required for the processing in the RAM with the small storage capacity. In addition, the image data belonging to an arbitrary area can be transferred by controlling the range of the area used for the transfer by a program. Furthermore, since a plurality of data transfer units are provided in the areas, the transfer units can be used in an overlap manner, and hence the present embodiment can be applied to the flexible application.

As described above, according to the present embodiment, the image processing apparatus having only the necessary minimum storage capacity can be applied to the application as well using the high definition image for which the large storage capacity is required if normal.

Figure 8A:
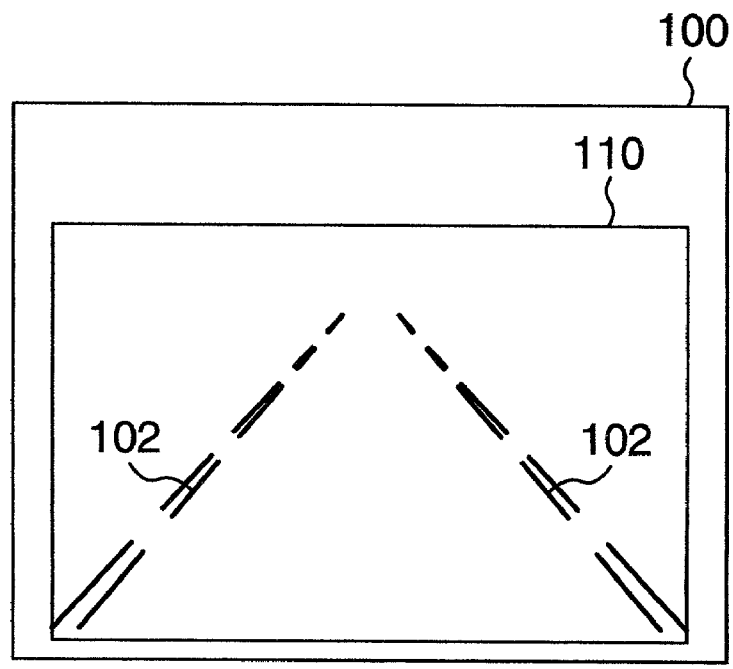
FIGS. 8A and 8B are respectively diagrams each useful in explaining a method of reducing a storage capacity utilizing edge parts.
Figure 8B:
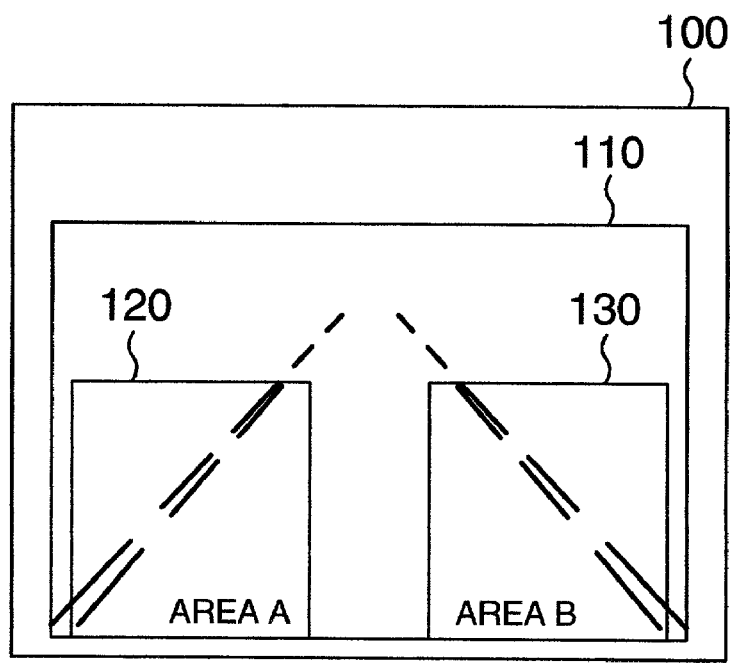

While in each of the above-mentioned embodiments, the description has been given with respect to the method wherein the reduction of an amount of data stored in the RAM 12 is realized by limiting the area to be processed, in the following embodiment, the description will hereinbelow be given with respect to a method of reducing an amount of data utilizing information of edge parts of a white line as shown in FIGS. 8A and 8B.

Figure 9:
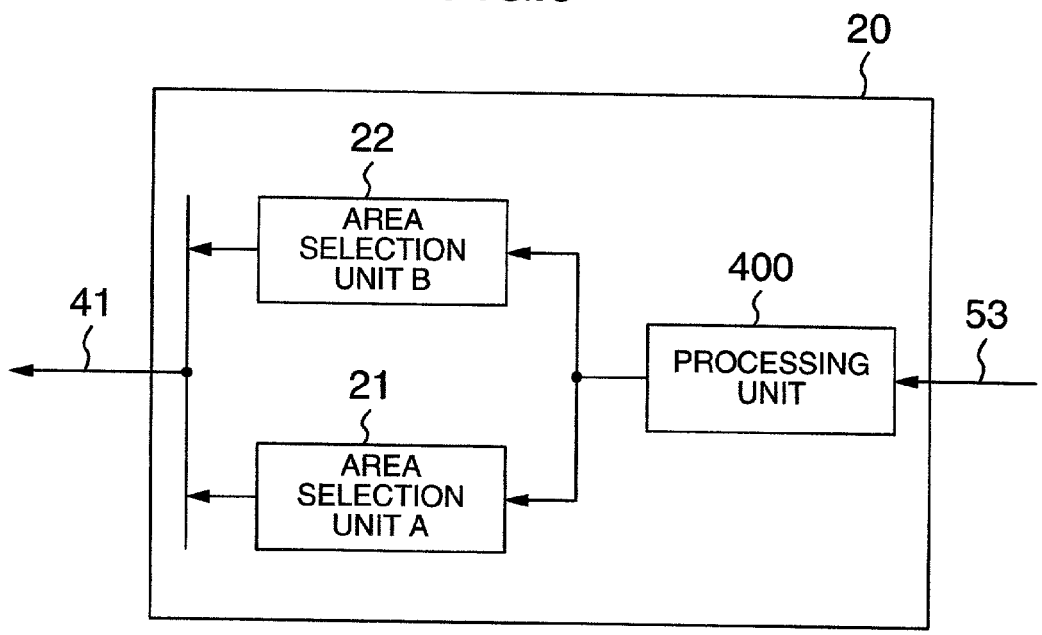
FIG. 9 is a block diagram showing a configuration of another embodiment of a data transfer unit.

As shown in FIG. 8A, when recognizing white lines on the basis of image data, belonging to an area 110, of image data for one screen outputted by the image pickup device 3, if the image data used to recognize white lines 102 is subjected to the filtering processing for contour enhancement, then it becomes possible to extract the both sides of the white line 102 in the form of edge parts. That is, it becomes possible to extract the image data of the edge parts in which the concentration change (luminance change) in the image is equal to or larger than a fixed level. Since the processing of recognizing the white line 102 is executed by utilizing the edge information which the white line 102 has, only the information (image data) of the edge parts is used in the processing in many cases. If only this information of the edge parts is used in the recognition processing, then an amount of data to be stored may be an amount of data which is less than amount of all of the image data belonging to the area 110 is stored. Further, as for the information to be recorded, the coordinate information of the positions which are determined to be the edge parts may also be used. In FIG. 8B, the data transfer of the coordinate information used to specify the area A 120 and the area B 130 is carried out in combination with the data transfer of the image data of the edge parts, i.e., the different kinds of information is transferred separately for kinds, whereby it is possible to reduce further the storage capacity for the data required for the processing. A concrete configuration of the data transfer unit 20 at this time is shown in FIG. 9.

The data transfer unit 20 includes a preprocessing unit 400 in addition to an area selection unit A 21 and an area selection unit B 22. The data transfer unit 20 is adapted to subject the image data which has been inputted through a wiring 53 in order to recognize the white lines to the filtering processing for contour enhancement in the preprocessing unit 400 to extract the edge parts to transfer only the information (image data) of the edge parts to the RAM (local memory) 12 within the single chip 1 using the area selection unit A 21 and the area selection unit B 22. At this time, for the area selection unit A 21, the same one as the area selection unit A 21 shown in FIG. 4 may be employed. But, the function of determining whether or not only the image data of interest is the image data of the coordinates of the input image data, but also the image data of interest is the image data of the edge parts thereof is added to the write control unit 24.

According to the present embodiment, the image data is transferred on the assumption that only the image data of the edge parts is used in the processing, whereby it is possible to reduce the storage capacity required for the image processing apparatus. In addition, the area as the object of the processing is limited on the screen, whereby it is possible to obtain the effect for the combination of the reduction of an amount of data due to the limitation of the area and the method of limiting the information to the information of the edge parts. In other words, it is possible to reduce further the storage capacity, for the image data, required for the processing.

While in each of the above-mentioned embodiments, the image pickup device 3 has been handled as the device for outputting simply the image data, it is possible to adopt the configuration in which the unit 30 for reducing an amount of processing data shown in FIG. 1 is added to the image pickup device 3. An embodiment at this time will hereinbelow be described with reference to FIG. 10.

Figure 10:
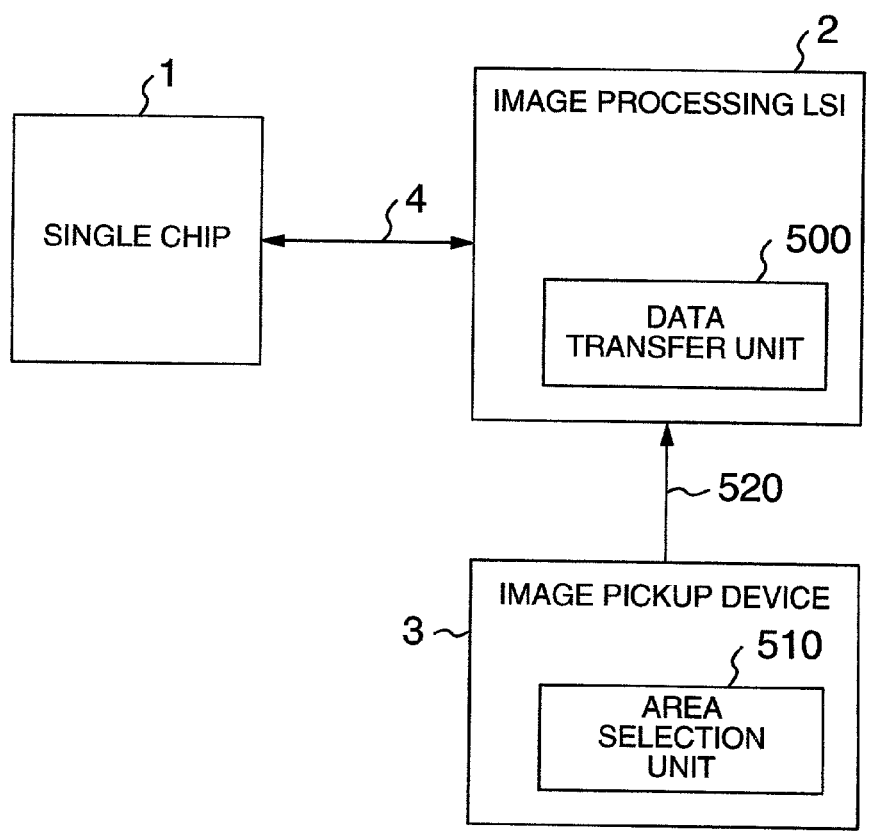
FIG. 10 is a block diagram showing a configuration of an image processing apparatus according to a second embodiment of the present invention.

Referring now to FIG. 10, in the image processing apparatus according to the present embodiment, an area selection unit 510 is provided in the image pickup device 3, and a data transfer unit 500 is provided in the image processing LSI 2. That is, the image pickup device 3 has the functions as an image data generation unit for converting information of light from a subject into information of the electric charges to generate successively the image data for one screen, an area selection unit for selecting the image data, belonging to a plurality of areas, of the image data thus generated, and a data output unit for outputting the image data thus selected belonging to a plurality of areas together with the area information used to specify the areas through a bus 520.

Figure 11A:
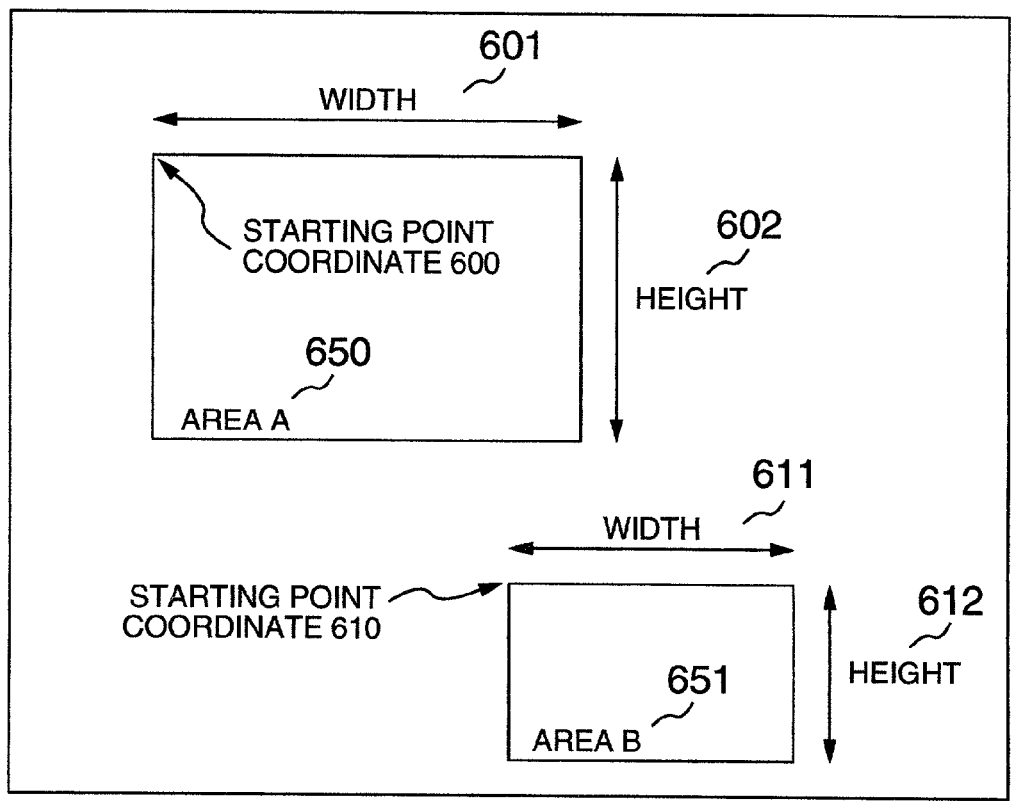
FIG. 11A is a diagram useful in explaining the area selection.
Figure 11B:
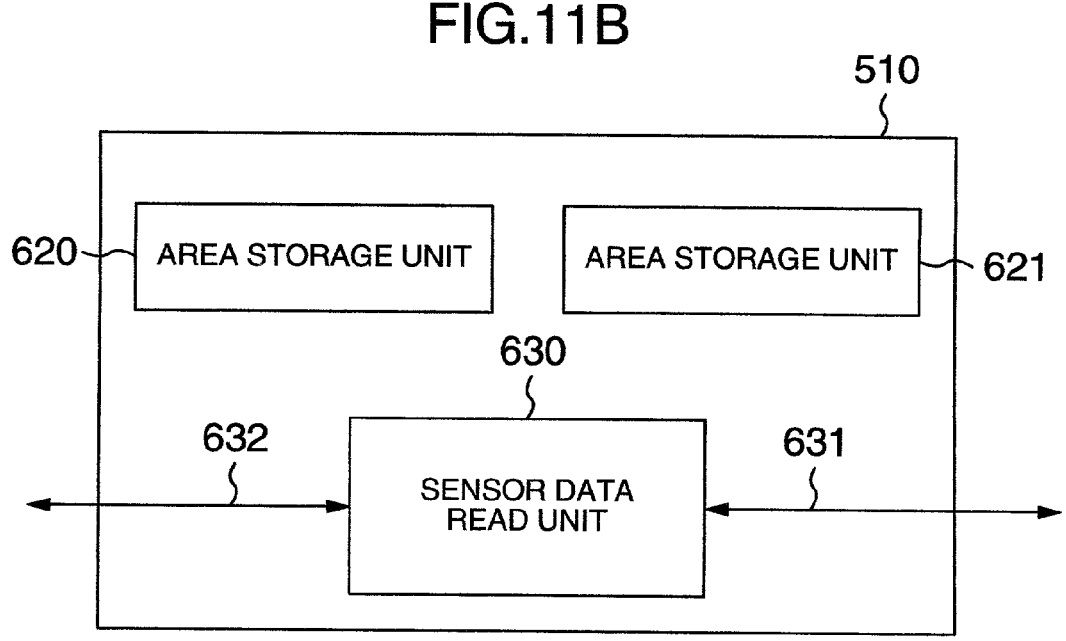
FIG. 11B is a block diagram showing a configuration of an area selection unit.

The area selection unit 510, as shown in FIGS. 11A and 11B, executes the processing of setting an area A 650 and an area B 651, and when setting the area A 650 belonging to the screen 100, sets the data of a starting point coordinate 600, a width 601 and a height 602 of the area A 650, while when setting an area B 651, sets the data of a starting point coordinate 610, a width 611 and a height 612 of the area B 651. After the data of the starting point coordinates, the width and the height of each of the areas A 650 and the area B 651 has been set, the information of the area A 650 and the area B 651 is recorded in an area storage units 620 and 621 shown in FIG. 11B, respectively. The data recorded in the area storage units 620 and 621 is read out by a sensor data read unit 630 to be outputted together with the area information used to specify the areas through a wiring 632. In this case, in the image pickup device 3, the sensor data read unit 630 having the function of outputting the image data stored in the area storage unit 620 has control of the output data.

To put it concretely, an array of photoelectric receiving devices in a CMOS sensor is likened to an SRAM, and under this condition, a circuit for an SRAM access may be added to the sensor data read unit 630. At this time, the processing of reading out the data is executed with the coordinate values as an address. In addition, the control may also be carried out in such a way that the output signals from the CMOS sensor are classified into the signal which is required to be outputted to the outside of the image pickup device 3 and the signal which is not required to be outputted thereto in the sensor data read unit 630 to output only the necessary data. Further, both of the valid data and the invalid data may also be outputted to output the signal used to identify whether the outputted data is valid or invalid.

Figure 12:
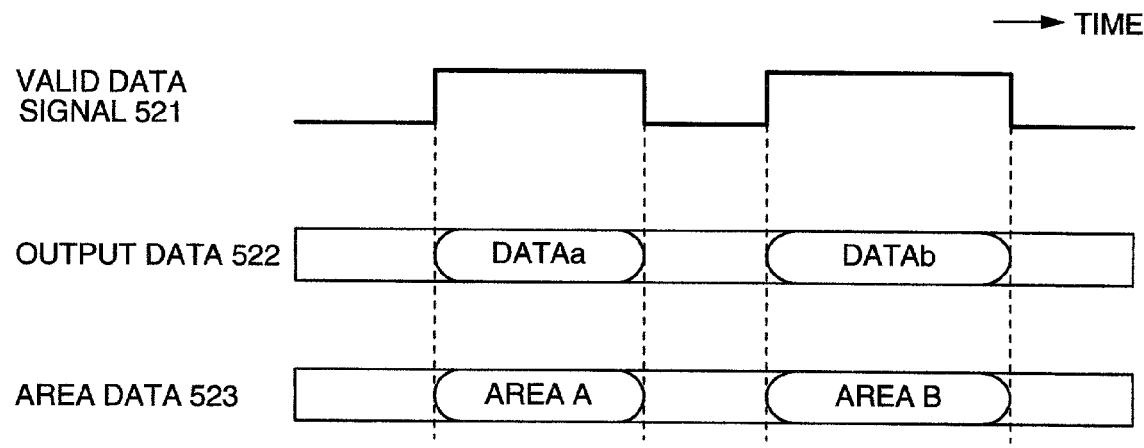
FIG. 12 is a time chart useful in explaining a structure of output data outputted from an image pickup device.

For example, in the case where the data of a plurality of areas is outputted from the image pickup device 3, as shown in a time chart of FIG. 12, whenever the valid data signal 521 is outputted, output data 522 as the image data belonging to an area A is outputted together with area data 503 used to specify the area A, and also image data (output data) 522 belonging to an area B is outputted together with area data 523 used to specify the area B. Now, the area data 523 used to specify the area A and the area B may be the information used to determine to which DATA a and DATA b each as the output data 522 belong, and hence the information such as the coordinate information or an ID of an area may be employed for the area data 523.

As described above, in the present embodiment, when only the image data, belonging to the specific area, of the image data generated by the image pickup device 3 is outputted to the image processing LSI 2 through the wiring 520 to be transferred to the single chip 1 through the bus 4 by the data transfer unit 500 in the image processing LSI 2, the data which is required to be recorded in the RAM 12 in the single chip 1 is selected in the image pickup device 3. As a result, the image processing LSI 2 has only to include the function of transferring the data.

Therefore, according to the present embodiment, the function of selecting data is additionally provided in the image pickup device 3, whereby it is possible to read out only the data used in processing at high speed.

Figure 13:
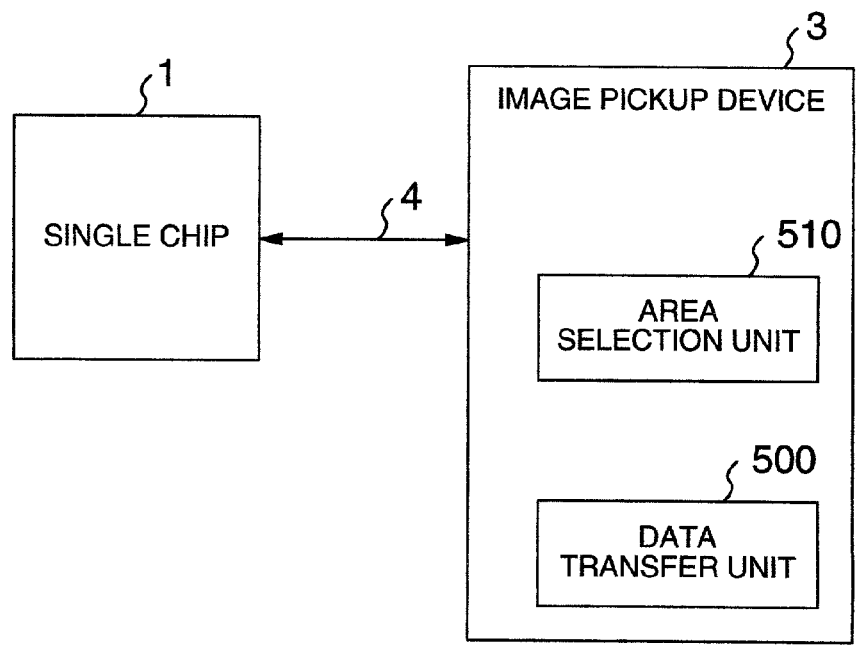
FIG. 13 is a block diagram showing a configuration of an image processing apparatus according to a third embodiment of the present invention.

Next, the description will hereinbelow be given with respect to an embodiment when the data transfer unit 500 provided in the image processing LSI 2 is additionally provided in the image pickup device 3 with reference to FIG. 13.

The image pickup device 3 in the present embodiment has the functions of a data transfer unit 500 and an area selection unit 510. The image processing apparatus according to the present embodiment is constituted by the single chip 1 and the image pickup device 3, and hence can be miniaturized as compared with the image processing apparatus according to the above-mentioned embodiment. Then, the image pickup device 3 and the single chip 1 are connected to each other through a bus 4, and the register and the like of the image pickup device 3 are mapped on the memory space part of the single chip 1. At this time, the register of the image pickup device 3 corresponds to the area storage unit 620 shown in FIG. 11B. In addition, each of the photoelectric receiving devices included in the image pickup device 3 is mapped on the memory space part of the single chip 1 so that the image pickup device 3 may also be handled as the external memory. That is, the addresses of the image data stored in the RAM 12 can be mapped in such a way as to be associated with the memory space part of the CPU 11. This becomes possible by adding either the circuit for making the DMA transfer possible or the circuit described with reference to FIG. 11B.

Figure 14:
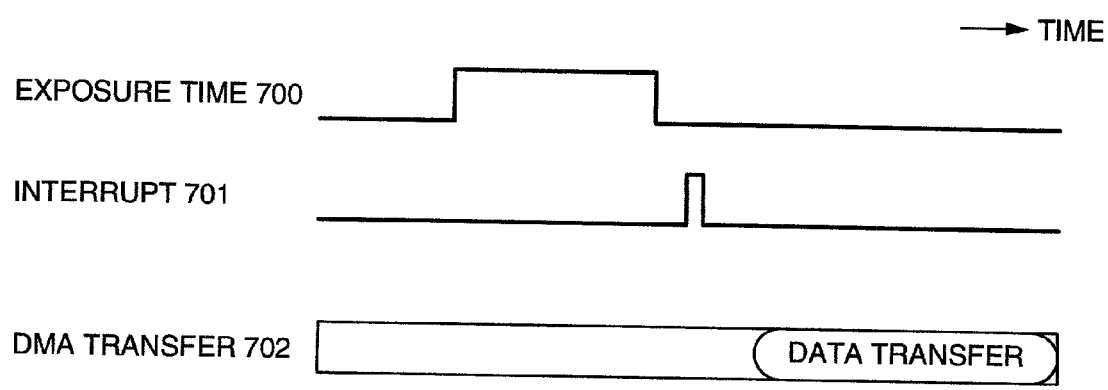
FIG. 14 is a time chart useful in explaining the operation of the image processing apparatus shown in FIG. 13

The transfer of the image data from the image pickup device 3 in the present embodiment to the RAM 12 of the single chip 1, as shown in FIG. 14, is carried out on condition that completion of an exposure period of time 700 has been detected. That is, when taking in the image at intervals of 1/60 to 1.0 seconds to generate successively the image data for one screen, the image pickup device 3 generates the image data whenever the exposure period of time 700 has elapsed. Then, an exposure time detection unit for detecting the exposure period of time 700 is provided in the image pickup device 3. At the time when the exposure period of time detection unit has detected the completion of the exposure time 700, the image pickup device 3 generates an interrupt 701 to the single chip 1. In response to the interrupt 701 from the image pickup device 3, the CPU 11 in the single chip 1 instructs the image pickup device 3 to start the DMA transfer 702, and then the DMA transfer of the image data from the image pickup device 3 to the RAM 12 in the single chip 1 is started on the basis of the processing by the data transfer unit 500. In this case, when an interrupt is generated every line, the DMA transfer is generated every line. In addition, when an interrupt is generated every field, the DMA transfer is activated every field. By the way, a timing chart shown in FIG. 14 may be defined for every line of the image, or may be defined for every field. In particular, in the case of a CMOS sensor, it is general in the operation of the current CMOS sensor that FIG. 14 is viewed as a timing chart for each of lines.

According to the image pickup device 3 of the present embodiment, since the image pickup device 3 is provided with the function of transferring the image data of the specified area in the screen to be formed into one-chip module, this can contribute to the small space and the low cost.

While in each of the above-mentioned embodiments, the description has been given with respect to the procedure in which in the transfer of the image data, the image data of a plurality of areas is transferred at once, there may also be adopted the procedure in which the image data of a plurality of areas is selected from the generated image data for one screen, the selected image data is divided into a plurality of single areas, and the image data in each of the single areas is transferred separately in plural times.

In addition, there may be adopted the procedure in which a plurality of image data of a single area is selected from the generated image data for one screen, and the selected image data is successively transferred separately in plural times. In this case, that procedure can be realized by storing the processing program for transferring the image data of a single area separetely in plural times. For example, that procedure can be realized by executing the processing program to set an area having image data to be transferred to a memory separately in plural times in the image data for one screen obtained through one exposure to transfer successively the image data from the image pickup device to the memory in the single chip.

In addition, when the image data is transferred separately in plural times every single area, as for the area selection unit for the data transfer unit, there may be employed a single area selection unit for selecting a single area plural times.

Furthermore, transferring the image data, in a plurality of areas, of the image data for one screen separately in plural times means that the image pickup device serves as the memory too and hence the image pickup device holds the image data until the transfer of all of the image data generated by the image pickup device has been completed.

As set forth hereinabove, according to the present invention, before storage of image data in an image data storage unit, a plurality of image data, an amount of which is less than that of input-image data, of the image data used in the arithmetic operation processing is selected, and only the selected image data is stored in an image data storage unit. Therefore, it is possible to reduce the storage capacity of the image data storage unit as a local memory without employing any of the external memories, which can contribute to the small space and the low cost.

It should be further understood by those skilled in the art that the foregoing description has been made on embodiments of the invention and that various changes and modifications may be made in the invention without departing from the spirit of the invention and the scope of the appended claims.

What is claimed is:

1. An image processing apparatus comprising:
   image data storage means for storing therein image data transferred thereto;
   arithmetic operation processing means for arithmetically processing the image data stored in said image data storage unit; and
   data transfer means for receiving, as its input, image data and for transferring a plurality of image data, an amount of which is less than that of inputted image data, of the input image data to said image data storage unit,
   wherein said data transfer means transfers the image data in a plurality of areas on a screen as the object of the arithmetic operation processing in said arithmetic operation processing means separately in plural times every image data in a single area.

2. An image processing apparatus comprising:
   image data storage means for storing therein image data transferred thereto;
   arithmetic operation processing means for arithmetically processing the image data stored in said image data storage unit; and
   data transfer means for receiving, as its input, image data and for transferring a plurality of image data, an amount of which is less than that of inputted image data, of the input image data to said image data storage unit,
   wherein said data transfer means transfers, as the plurality of image data, the different kinds of image data separately for kinds.

3. An image processing apparatus comprising:
   image data storage means for storing therein image data transferred thereto;
   arithmetic operation processing means for arithmetically processing the image data stored in said image data storage unit; and
   data transfer means for receiving, as its input, image data and for transferring a plurality of image data, an amount of which is less than that of inputted image data, of the input image data to said image data storage unit,
   wherein said data transfer means transfers the image data of a plurality of edge parts in which the change in concentration within the image is equal to or higher than a fixed level and also transfers coordinate information of the plurality of edge parts.

4. An image processing apparatus comprising:
   image data storage means for storing therein image data transferred thereto;
   arithmetic operation processing means for arithmetically processing the image data stored in said image data storage unit; and
   data transfer means for receiving, as its input, image data and for transferring a plurality of image data, an amount of which is less than that of inputted image data, of the input image data to said image data storage unit,
   wherein said data transfer means transfers the image data, of a plurality of edge parts in which the change in concentration within the image is equal to or higher than a fixed level, of the image data within a plurality of areas on a screen as the object of the arithmetic operation processing in said arithmetic operation processing means, and also transfers coordinate information of the plurality of edge parts.

5. An image pickup device comprising:
   image data generation means for converting information of light from a subject into information of the electric charges to successively generate image data for one screen;
   area selection means for selecting the image data, belonging to a plurality of areas, of the image data for one screen generated by said image data generation means; and
   data output means for outputting the image data belonging to the plurality of areas selected by said area selection means and area information used to specify the plurality of areas, wherein the area information and the image data are output via different signal lines.

6. An image pickup device comprising:
   image data generation means for converting information of light from a subject into information of the electric charges to generate successively image data for one screen;
   area selection means for selecting the image data, belonging to a plurality of areas, of the image data for one screen generated by said image data generation means;
   data output means for outputting the image data belonging to the plurality of areas selected by said area selection means together with area information used to specify the plurality of areas; and
   exposure time detection means for detecting that the exposure time required to generate the image data for one screen has been completed; and data transfer means for transferring the image data outputted by said data output means to said image data storage means for storing therein image data on condition that the completion of the exposure time has been detected by said exposure time detection means.

7. An image pickup device according to claim 6, further comprising transfer request output means for when the completion of the exposure time has been detected by said exposure time detection means, outputting a transfer request for transferring the image data to the destination of transfer.

8. An image pickup device comprising:
- image data generation means for converting information of light from a subject into information of the electric charges to generate successively image data for one screen; and
- area selection means for selecting the image data, belonging to a plurality of areas, of the image data for one screen generated by said image data generation means; and
- image data storage means for storing therein the image data generated by said image data generation means in correspondence to pixels for one screen, wherein addresses of the image data stored in said image data storage means are mapped in such a way as to be associated with a memory space part in said arithmetic operation processing means for operating arithmetically and processing the image data.

* * * * *